US008500831B2

(12) United States Patent
Lenk

(10) Patent No.: US 8,500,831 B2
(45) Date of Patent: Aug. 6, 2013

(54) DEVICE FOR CONTINUOUSLY CONDITIONING FED-OUT NATURAL GAS

(75) Inventor: Andreas Lenk, Wardenburg (DE)

(73) Assignee: EWE GASSPEICHER GmbH, Oldenburg (DE)

( * ) Notice: Subject to any disclaimer, the term of this patent is extended or adjusted under 35 U.S.C. 154(b) by 243 days.

(21) Appl. No.: 12/737,592

(22) PCT Filed: May 12, 2009

(86) PCT No.: PCT/DE2009/000668
§ 371 (c)(1), (2), (4) Date: Jan. 28, 2011

(87) PCT Pub. No.: WO2010/015217
PCT Pub. Date: Feb. 11, 2010

(65) Prior Publication Data

US 2011/0120006 A1 May 26, 2011

(30) Foreign Application Priority Data

Aug. 4, 2008 (DE) ......................... 10 2008 036 244

(51) Int. Cl.
*B01J 8/00* (2006.01)
*B01J 8/02* (2006.01)
*B01J 10/00* (2006.01)

(52) U.S. Cl.
USPC .......... 48/127.9; 422/211; 422/217; 422/187; 422/129; 422/112

(58) Field of Classification Search
USPC .......... 422/211, 217, 187, 129, 112; 48/127.9
See application file for complete search history.

(56) References Cited

U.S. PATENT DOCUMENTS

| | | | | |
|---|---|---|---|---|
| 3,330,773 | A | 7/1967 | De Hart, Jr. | |
| 4,701,188 | A * | 10/1987 | Mims | ................................ 95/18 |
| 5,003,782 | A | 4/1991 | Kucerija | |
| 6,730,272 | B2 | 5/2004 | Reimert | |
| 2005/0095185 | A1 | 5/2005 | Gary | |
| 2005/0095186 | A1 | 5/2005 | McGee | |
| 2007/0283705 | A1 | 12/2007 | Taylor | |

FOREIGN PATENT DOCUMENTS

| | | |
|---|---|---|
| EP | 0 529 474 | 3/1993 |
| EP | 0 635 673 | 1/1995 |
| EP | 0 920 578 | 8/2003 |
| RU | 55 928 | 8/2006 |
| RU | 55928 | 8/2006 |

* cited by examiner

*Primary Examiner* — Jill Warden
*Assistant Examiner* — Lessanework Seifu
(74) *Attorney, Agent, or Firm* — Collard & Roe, P.C.

(57) ABSTRACT

A device for continuously conditioning fed-out natural gas prior to feeding the same to supply lines leading to consumers has a mixing station for producing a burnable gas from natural gas and oxygen, a reactor container for a catalytic combustion of an introduced mixture of burnable gas and natural gas, at least one drying station that is connected downstream of an outlet of the reactor container, at least one separator, particularly for water, and at least one expansion fitting for reducing the pressure. The reactor container and separator chamber of the separator are disposed in an enclosed housing. The mixing chamber, into which a first feed line for fed-out cold natural gas opens, is disposed in the housing between the reactor container and the separator chamber.

13 Claims, 2 Drawing Sheets

DEVICE FOR CONTINUOUSLY CONDITIONING FED-OUT NATURAL GAS

CROSS REFERENCE TO RELATED APPLICATIONS

This application is the National Stage of PCT/de2009/000668 filed on May 12, 2009, which claims priority under 35 U.S.C. §119 of German Application No. 10 2008 036 244.1 filed on Aug. 4, 2008, the disclosure of which is incorporated by reference. The international application under PCT article 21(2) was not published in English.

The invention relates to a device for continuously conditioning fed-out natural gas prior to it being fed into supply lines leading to consumers, with a mixing station for producing a burnable gas from natural gas and oxygen, with a reactor container for catalytic combustion of a fed-in mixture of burnable gas and natural gas, with at least one drying station downstream of an outlet from the reactor container which has at least one separator, more particularly for water, and with at least one expansion fitting for reducing the pressure.

A device of the above type is known from patent specification EP 0 920 578 B1.

In the known device the fed-out natural gas is heated to compensate for the Joule-Thomson effect which occurs during its expansion. This takes place through the catalytic combustion of a partial flow of fed-out natural gas mixed with oxygen, which is then mixed back into the main flow, whereby the mixture flowing onwards is heated to a mixing temperature.

The natural gas flow heated to the mixing temperature then flows through at least one separator stage before expansion takes place. The heated natural gas leaves the known device saturated with water vapour and has to undergo costly conditioning in a drying station that has to be arranged after the expansion station.

A drawback of the known device can therefore be seen in the fact that the water produced during the catalytic conversion of oxygen and higher hydrocarbons of the natural gas cannot be condensed out and remains largely in the form of water vapour in the continuing gas flow. Consequently a downstream gas drying system must be larger, and after expansion the occurrence of condensation in the pipeline carrying the expanded gas must be anticipated.

On the one hand this is unfavourable from an economic point of view, and on the other hand it poses the risk of failure of the feed-out section due to condensation in the pipeline and/or damage being done to downstream installations due to a water hammer effect.

The time spent by the cold natural gas in the mixing station is also relatively short, so that the downstream water separator in the known device has almost no effect.

The aim of the invention is to provide a device with which the fed-out natural gas can be continuously conditioned so that it suitable for being directly fed into pipelines leading to consumers.

This objective is achieved by the features of claim 1.

Further developments and advantageous embodiments of the device in accordance with the invention are set out in claims 2 to 13.

In the continuous conditioning of fed-out natural gas with the device in accordance with the invention, expansion of the natural gas flowing from the natural gas tank at relatively high pressure takes place immediately before it is introduced into the housing of the device via the inlets for natural gas in the upstream expansion fitting. Further expansions then take place within the container, namely once in the reactor and again in the mixing chamber in which fed-in cold natural case is mixed to the natural gas flow flowing out of the reactor.

Through expansion the natural gas cools strongly so that condensation and hydrate formation immediately takes place at the inlet of the natural gas into the container, the in-feed lines. The precipitated condensate can be relatively easily trapped, and/or collected and removed.

In addition to the reactor container, the housing also has at least one separator chamber. The gas flowing out of the separator chamber enters the supply lines for consumers. Accordingly relatively short flow paths are present, with the advantage that any condensation only remains in contact with the natural gas for a short time. In this way contamination of the condensation, which is mainly water, with higher hydrocarbon chains is reduced.

As the mixing chamber, into which a first in-feed for fed-out cold natural gas opens, is arranged in the casing between the reactor container and the separator chamber, the flow paths are again advantageously reduced to a minimum dimension. Also contributing to this is the fact that the transition from the reactor container into the mixing chamber is suitable for ensuring the direct in-feed of the heated natural casing flowing out of the reactor container into the mixing chamber. The transition can, for example, be in the form of a partition wall between the reactor container and mixing chamber which has a number of apertures and is therefore similar to a sieve and/or perforated base.

The transition allows hot gases to flow out of the reactor contain into the mixing chamber, whereby during the inflow of the hot gases into the mixing chamber, optimum swirling and thereby mixing with the cold natural gas fed into the mixing chamber and dissolution of the natural gas hydrates takes place. Through the mixing the hot natural gas passing from the reactor container into the mixing chamber is strongly cooled, which means that condensation starts immediately in the mixing chamber and condensate is precipitated.

In the device in accordance with the invention the condensate is separated from the natural gas at the expansion points before the inlets into the housing of the device and also in the housing itself. Condensate separation takes place in the reactor container, in the mixing chamber and in the separator downstream of the mixing chamber in the direction of outflow of the treated gases.

The separator is part of the downstream drying station and comprises a separator chamber also arranged in the housing.

Particularly advantageously the separator chamber is divided into an area containing several cyclone separators and an area with several filter elements.

From the mixing chamber the natural gas mixture can flow through an outlet directly into the separator chamber adjacent to the mixing chamber where it initially enters the area containing several cyclone separators. The cyclone separators act as coarse separators and clean the expanded natural gas. Subsequent cleaning through fine separation takes place in the area of the separator chamber in which several filter elements are arranged.

The cleaned and condition natural gas then flows out of the device.

This structural implementation of the process for heating the fed-out natural gas making use of its cooling during expansion, in connection with the design of the inlet into the device with expansion valve and in conjunction with the measure of cooling the mixture of the gas flows before and after the reactor, provides an advantageous specific method of separating water from the natural gas and thereby gas conditioning with regard to the dew point of water vapour, if before entry into and leaving the device for continuously conditioning the fed-out natural gas, dew point measurements are taken which were processed and used by corresponding measuring and control technology.

As in the device in accordance with the invention it is also advantageously envisaged that the reactor container, the separator chamber and the mixer chamber have condensate drains into external condensate traps, the contact times between the natural gas and the condensate are as short as possible. On the one hand this prevents the condensate being carried through the device with the gas flow and on the other hand charging of the condensate with higher hydrocarbon chains.

The separate drainage of the condensate from the relevant process section has the advantage that variously contaminated condensates can each undergo suitable, special processing.

Combining filters and multiple cyclones to almost completely separate the condensates from the gas flow necessarily forces the gas flow through the separator, with the advantage of almost complete separation of the condensates from the gas. The device in accordance with the invention also has the advantage that its user benefits from its compact design in terms of space and installation costs, as all the essential components for carrying out conditioning, namely separators, preheaters, gas pressure reduction and measurement, gas drying and filters can be combined in the device according to the invention and installed at a suitable location on site.

The absence of movable parts such as pumps of suchlike reduces the operating and maintenance costs.

Essential to the invention is the combination of catalytic conversion of oxygen and hydrocarbon on the catalytic converter in the reactor container of the device with expansion directly in the mixing room, and also a tangential inflow of the natural gas via the first and second supply line not only into the mixing container, but more particularly into the housing around the reactor. This brings about optimum separation of the condensates and the condensation of the water vapour from the catalytic conversion without the local production of waste gases. The calculated degree of efficiency is 1.1 as the condensation and separation of the water vapour as well as the condensation heat are utilisable.

The device is dew point-controlled via the dew point measurement at the gas inlet and outlet, which can be implemented by specific variation of the added oxygen and variation of the quantity regulation by the regulating valves of the natural gas flow into the supply liens to the reactor and/or directly into the mixing zone.

Particularly advantageously the housing is in the shape of a hollow cylinder. In turn the reactor container is a component concentrically inserted into the hollow cylindrical housing. This component comes into contact with natural gas and/or the condensates, which due to the oxygen concentration in conjunction with the relatively high temperature of around 400° C. are particularly aggressive. The component used as the reactor container is therefore made of a chromium-nickel steel which is resistant to corrosion even at high temperatures.

In the device according to the invention, a packing of aluminium oxide introduced into the reactor container is envisaged as the reactor bed. The aluminium oxide has a granular surface which is vapour-coated with palladium and/or platinum.

The first and the second supply lines for natural gas are connected to the housing in such a way they open into the reactor container and the mixing chamber in approximately tangential alignment. This results in optimum mixing in the mixing zone and condensation of the water vapour from the hot reaction zone.

The housing forms an outer container and the reactor container used as the inserted component is the inner container of the housing. Both are dimensioned to that cold natural gas, fed-in via the second in-feed, can flow in a concentric annular space between the housing as the outer container and the reactor container as the inner container. Mixed into the fed-in cold natural gas is a partial flow diverted from the main flow of fed-out natural gas to which oxygen has been added in the mixing station and can thus be considered as burnable gas. This burnable gas is directed through the reactor container and then mixed with the natural gas fed in via the tangential in-feed.

In a special preliminary stage the burnable gas can be preheated to the activation temperature of the reactor so that the inflowing burnable can undergo immediate catalytic conversion in the reactor container.

As the cold natural gas fed into the housing via the tangential in-feed flows around the reactor container in the concentric annular space, cooling of the reactor container from outside occurs. This effect, which promotes the separation of condensate can be increased further in that at least one guide element is inserted into the concentric annular space. Particularly advantageously this guide element is a structurally simple, yet effective, strand element laid in a spiral fashion around the outer mantle of the reactor container, for example a flat steel band, which standing upright on the outer mantle, is attached to the reactor container.

In order to measure and control the expansion and combustion process taking place in the reactor container, several temperature sensors are provided. These are arranged next to each other along at least one measuring stick which extends into the reactor container in parallel to is longitudinal axis.

For example, 20 temperature sensors can be distributed along the length of a measuring stick.

Each temperature sensors sends the temperature it has determine in the form of a signal to the device for measuring and controlling the process. The process can therefore be influenced by appropriately controlled adjustments to the expansion fittings and the fittings for supplying oxygen to the mixing station in which a burnable gas is produced. The process can also be dew point-controlled, namely via dew point measuring device installed at last at the natural gas inlet and outlet.

An example of embodiment of the invention setting out further inventive feature is shown in the drawings. Wherein:

FIG. 1 shows a flow diagram to illustrate the operation of a device within a process for continuously conditioning fed-out natural gas. The natural gas flows in a main pipeline 1 out of a reservoir, for example a cavern, which is not shown, and finally, conditioned, into the supply pipeline 2 and on to consumers, also not shown.

Figure 1:
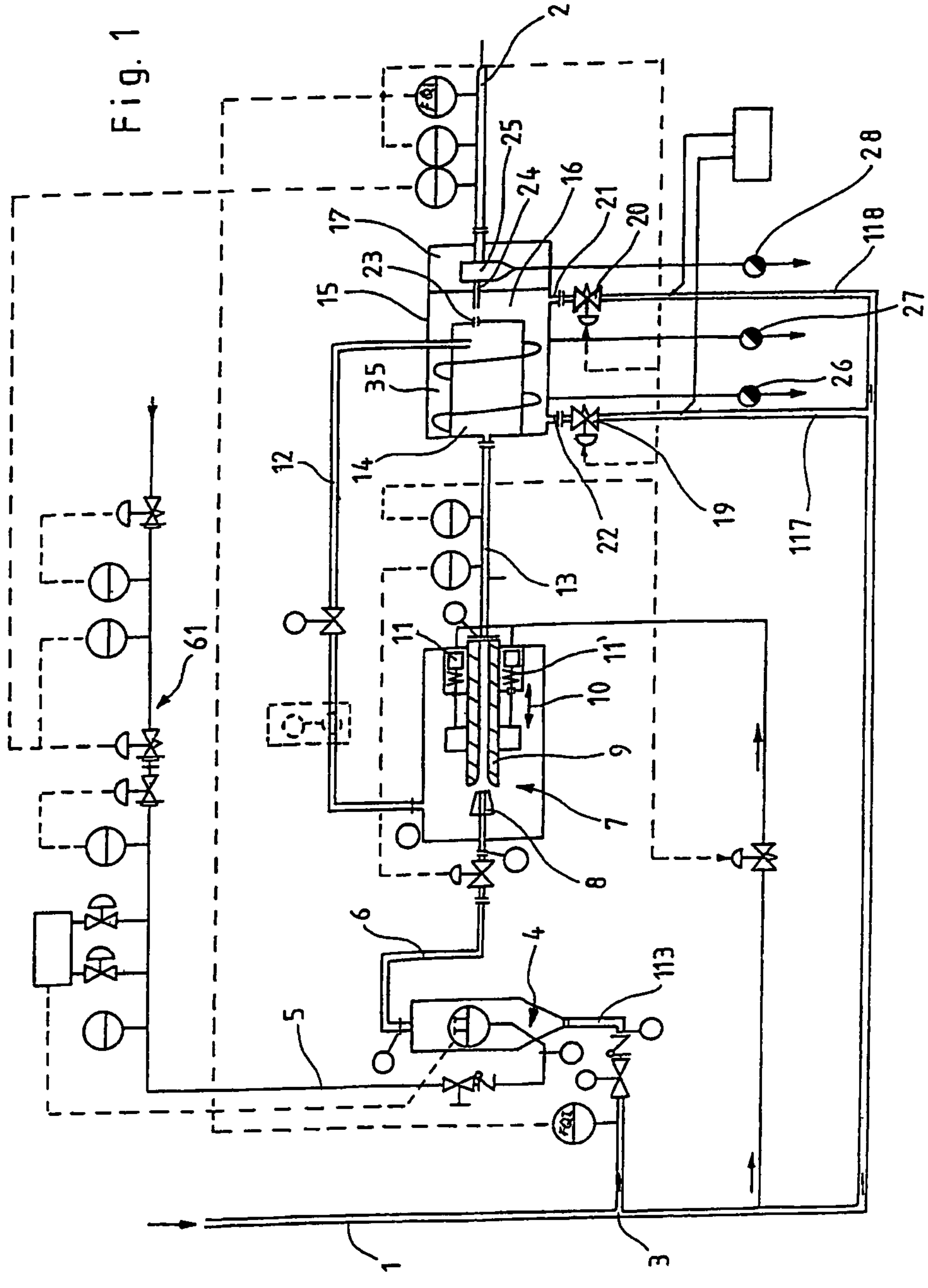
FIG. 1 shows a device for continuously conditioning fed-out natural gas in the form of a schematic flow diagram.

At branching point 3 a partial flow is diverted from the main pipeline 1 and taken to a mixing station 4.

FQI denotes a sensor for the degree of humidity/the resulting dew point.

Gaseous oxygen is supplied to the mixing station 4 with the oxygen line 5, said oxygen mixing in the mixing station 4 with the partial flow of natural gas diverted from the main pipeline 1 at point 3 and fed via connection 113. Monitoring of the production of a burnable gas from natural gas and oxygen in the mixing station 4 takes place by means of an electronic safety device 61, which is only schematically indicated here. From the mixing station 4 the burnable gas is taken via line 6 into a preheating station 7.

This preheating station 7 is designed as a jet pump, with a propelling nozzle 8 and a diffuser 9 arranged in a container.

The diffuser 9 can be moved relative to the propelling nozzle 8 in the direction of the double arrow 10 by means of working cylinders 11, 11', more particularly in a temperature-controlled manner, as indicated by the dashed lines here.

Via suction line 12, the preheating station 7 can draw in hot gases released from the catalytic combustion process which in the preheating station 7 mix with the partial flow of the cold natural gas brought in by the propelling nozzle 8. This mixing preheats the partial flow diverted a point 3, which flows out via the mixed line 13 and enters the reactor container 14 as shown here.

The reactor container is a component which is inserted into a housing 15.

Apart from the reactor container 14, a mixing chamber 16 and a separator 17 are located in the housing 15.

The fed-out cold natural gas flow is carried further through main pipeline 1 beyond branching point 3 and divides in partial lines 117 and 118. These lead to expansion fittings 19 and 20.

Seen in the flow direction, a first in-feed line 21, which opens into the mixing chamber 16, follows on from the expansion fitting 20.

Seen in the flow direction, the second in-feed 22 follows the expansion fitting 19. In the flow direction the expansion fittings 19 and 20 and thereby the in-feeds are upstream in relation to the point of gas inflow into the housing 15.

23 is a transition for the direct entry in to the mixing chamber 16 of the heated natural gas flowing out of the reactor container 14. Via the mixing chamber outlet 24 the heated gas mixture flows into the separation chamber 25 of the separator 17. 26, 27 and 28 are condensate drains. The condensate drains 26 and 27 are in the area of the housing in which the reactor container 14 is arranged. Condensate drain 28 is in the separator chamber 25 of the separator 17.

Figure 2:
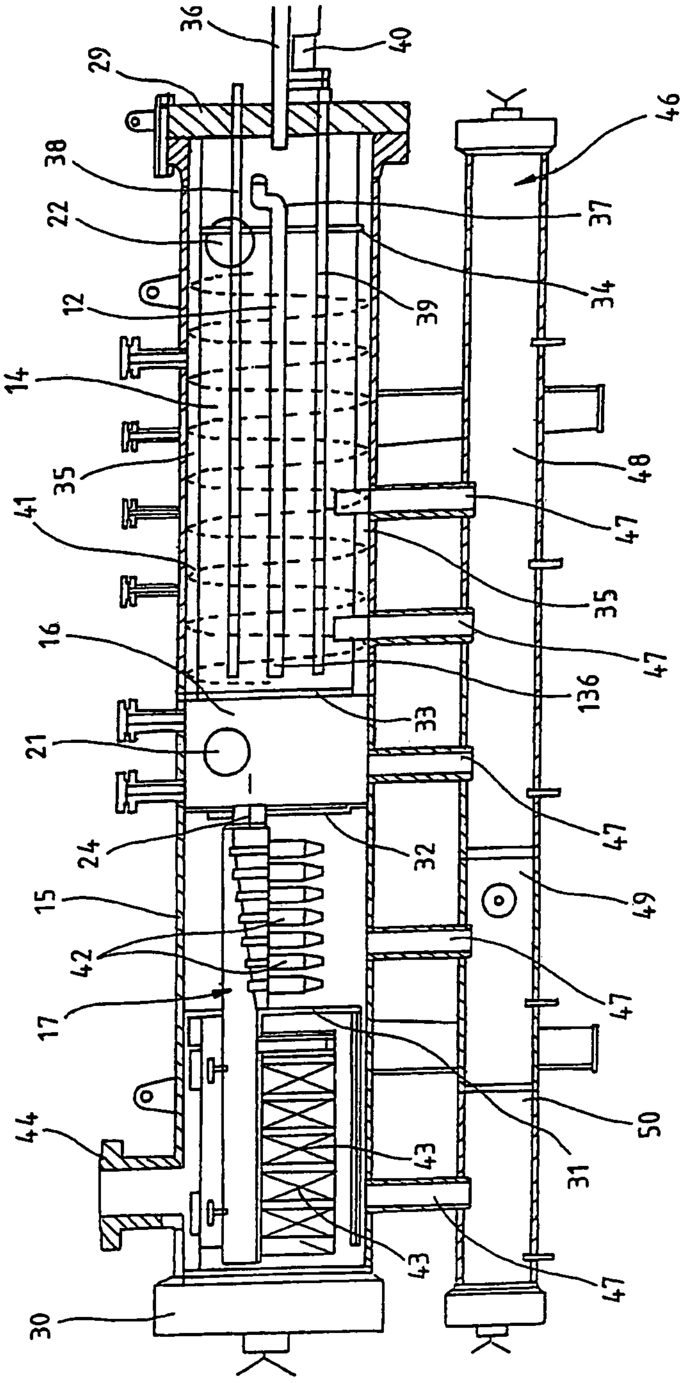
FIG. 2 shows side view of a housing with a reactor container, mixing chamber and separator in FIG. 1 in a longitudinal section.

FIG. 2 shows a side view of the housing 15 in accordance with FIG. 1 in section. The housing 15 is designed as a hollow cylinder which is closed with cover flanges 29, 30 at its ends. The in-feeds 21 and 22 are arranged eccentrically which results in a tangential inflow of the natural gas into the housing 15.

The housing 15 in the form of a hollow cylinder comprises the reactor container 14, the mixing chamber 16 and the separator 17. These fitting are separated from each other by means of transverse bases 31, 32, 33 and 34, whereby transverse bases 33 and 34 have a number of apertures, whereby they are similar to a sieve or perforated metal plate.

Whereas transverse bases 31 and 32 have a pure separating function, transverse bases 33 and 34 act as transitions due to the number of apertures. Transverse base 33 is the transition for the direct entry into the mixing chamber 16 of the natural gas, heated through the catalytic combustion, flowing out of the reactor container 14.

Transverse base 34 allows the preheated burnable gas flowing through pipe connection 36 to enter the reactor container 14 and then, on flowing through the catalytic converter bed, contained as packing in the reactor container 14, to take up the heat released by the catalytic conversion of the mixed in oxygen.

The burnable gas heated to activation temperature in the preheating station 7 is taken via the pipe connection 36 passing through the cover flange 29 into the interior of the reactor container 14. After flowing through the catalytic packing, in which the catalytic reaction takes place with the generation of heat, part of the hot gases is drawn in via the suction line 12 (FIG. 1) of the jet pump of the preheating station 7 in order to provide the heat energy required for the functioning of the preheating station 7.

The draw-in opening 136 of the suction line 12 is located in the vicinity of the transverse base 33 forming the transition 23 (FIG. 1) from the reactor container 14 to the mixing chamber 16.

From the reactor container 14 the suction line 12 also runs through the cover flange 29 after its offset 37 visible here.

At the same time the cover flange 29 acts as a carrier for the measuring sticks 38 and 39, fitted with temperature sensors, which extend into the reactor container 14 in parallel to the longitudinal axis of the reactor container 14. In addition, at least one heating rod 40 is provided as an option which can be used to heat the reactor bed, for example before starting up the device.

Arranged in the annular space 35 between the housing 15 and the outer mantle of the reactor container 14 there are guide elements 41, in this case a strand element in the form of a vertically welded on flat steel band arranged in spiral fashion around the outer mantle of the reactor chamber 14, here indicated by means of a dashed line.

The cold gas fed in via in-feed 22 flows around the reactor container 14 through the annular space 35 and cools the reactor so that the condensate is already separated.

The mixer chamber drain 24 leading to the separator chamber 25 is located in the transverse base 32 which separates the mixing chamber 16 from the separator 17.

The transverse base 31 divides the separator 17 into two adjacent areas; a first area containing the mixing chamber drain 24 and which is fitted with several cyclone separators 42 for coarse separation, and a second area in which several filter elements 43 are provided.

The gas flowing out of the mixing chamber 16 flows through the area with the cyclone separators 42, and then through the area with the filter elements 43. Finally the gas flows out of the device via the outlet 44 in conditioned state and thereby suitable for use.

The reactor container 14, mixing chamber 16 and separator 17 have condensate drains 47 which remove the condensate into an external condensate trap 46. The condensate trap 46 is divided into three chambers areas 48, 49 and 50, in which the condensates, depending on their degree of contamination by hydrocarbons, are collected separately which makes their disposal/processing more cost-effective.

The invention claimed is:

1. A device for continuously conditioning fed-out natural gas prior to feeding it to supply lines leading to consumers,
- with a mixing station for producing a burnable gas from natural gas and oxygen,
- with a reactor container for catalytic combustion of a fed-in mixture of burnable gas and natural gas,
- with at least one drying station connected downstream of the outlet of the reactor container, the at least one drying station having at least one separator for water, the at least one separator having at least one separator chamber, and
- with at least one expansion fitting for reducing pressure,
- wherein the reactor container and the at least one separator chamber are arranged in an enclosed housing,
- wherein a mixing chamber arranged in the housing between the reactor container and the at least one separator chamber,
- wherein a first in-feed for fed-out natural gas opens into the mixing chamber,
- wherein a passage connects the reactor container with the mixing chamber, the passage permitting direct entry of the heated natural gas flowing out of the reactor container into the mixing chamber, wherein the mixing chamber has a mixing chamber outlet which leads into the at least one separator chamber, wherein the reactor container, the at least one separator chamber and the mixing chamber have condensate drains leading into external condensate traps, wherein a second in-feed for fed-out natural gas opens into an area of the housing which corresponds to the arrangement of the reactor container in the housing, and wherein expansion fittings are connected upstream of the first and second in-feeds for natural gas into the housing.

2. The device in accordance with claim 1, wherein the housing is in the form of a hollow cylinder.

3. The device in accordance with claim 2, wherein the reactor container is a component concentrically inserted into the hollow cylindrical housing.

4. The device in accordance with claim 1, wherein the reactor container contains a packing of catalytic granules with a granule surface which is vapor-coated with palladium and/or platinum.

5. The device in accordance with claim 1, wherein the first and the second in-feeds of natural gas open tangentially into the housing containing the reactor container and into the mixing chamber.

6. The device in accordance with claim 5, wherein the reactor container has a transverse base adjacent the mixing chamber, and wherein the transverse base has the passage and a number of apertures to form a sieve.

7. The device in accordance with claim 6, wherein the mixing chamber has a mixing chamber drain, wherein the separator has a separator transverse base disposed opposite from the transverse base of the reactor container, wherein the mixing chamber is disposed adjacent to the at least one separator, and wherein the mixing chamber outlet is an opening in the separator transverse base.

8. The device in accordance with claim 7, wherein the housing has a housing outlet, and wherein the at least one separator is divided into an area containing several cyclone separators and an area with several filter elements, said areas being arranged in the flow path of the natural gas between the mixing chamber outlet and the housing outlet.

9. The device in accordance with claim 1, with a concentric annular space disposed between the housing and the reactor container, wherein at least one guide element is inserted into the concentric annular space, the at least one guide element being in the form of an inserted component.

10. The device in accordance with claim 9, wherein the reactor container has an outer mantle, wherein the concentric annular space is disposed between the housing and the outer mantle of the reactor container, and wherein the at least one guide element is a strand element laid in a spiral fashion around the outer mantle of the reactor container.

11. The device in accordance with claim 10, wherein the strand element is a flat steel band arranged vertically on the outer mantle on the reactor container.

12. The device in accordance with claim 1, wherein the reactor container has at least one temperature sensor.

13. The device in accordance with claim 12, wherein several temperature sensors are arranged next to each other along at least one measuring stick extending into the reactor container and in parallel to it's a longitudinal axis of the reactor container.

* * * * *

UNITED STATES PATENT AND TRADEMARK OFFICE

CERTIFICATE OF CORRECTION

PATENT NO. : 8,500,831 B2
APPLICATION NO. : 12/737592
DATED : August 6, 2013
INVENTOR(S) : Lenk It is certified that error appears in the above-identified patent and that said Letters Patent is hereby corrected as shown below:

In the Claims

In Column 6, line 61 (line 14 of Claim 1) after the word “chamber” please insert: --is--.

Signed and Sealed this
Thirty-first Day of December, 2013

Margaret A. Focarino
*Commissioner for Patents of the United States Patent and Trademark Office*